May 11, 1937. M. NOVATI 2,079,949
COUPLING FOR PIPES AND THE LIKE
Filed March 13, 1935
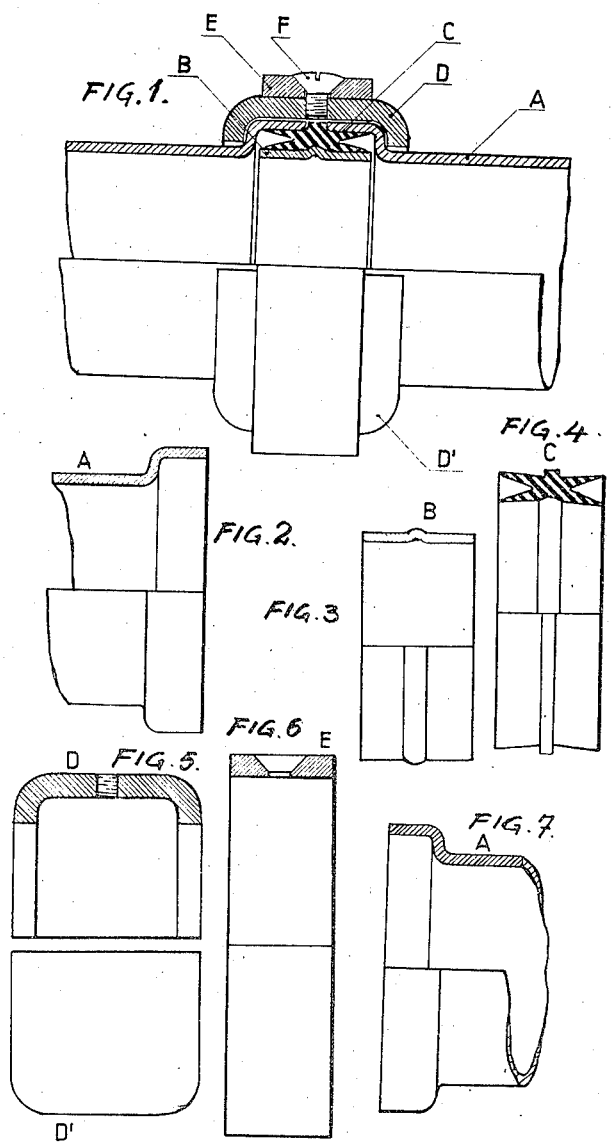

Patented May 11, 1937

2,079,949

UNITED STATES PATENT OFFICE 2,079,949

COUPLING FOR PIPES AND THE LIKE

Mario Novati, Milan, Italy

Application March 13, 1935, Serial No. 10,924
In Italy April 20, 1934

4 Claims. (Cl. 285—194)

The present invention has for its subject matter a coupling for pipes and the like which secures a firm connection, tightness, and the possibility of mutual displacement of the parts without need of any connecting bolts.

The accompanying drawing illustrates an embodiment of the invention by way of example.

Fig. 1 is a view, partly in section, of a coupling applied to the ends of two pipes.

Figs. 2 to 7 incl. show, partly in view and partly in section, the various parts making up the coupling.

A, A are the adjacent ends of the pipes which may be of the spigot and socket or other type positioned so as to form an internal annular coupling chamber or zone; B is a ring (preferably with shaped surface) which is placed within the pipes at the coupling zone; C is an india rubber gasket or like packing so shaped as to adhere with its inner surface as by a rib and groove connection to the outer surface of the ring B, and having an external rib extending into the space left between the adjacent ends of the pipes A—A; D and D' are two half covers of cup or cylindrical shape according to the shape of the pipe ends; E is a clamping ring externally applied to the said covers; F is a locking screw intended to render the ring E solid with one of the said half covers, this half cover being bored to suit and the bore being internally screw-threaded.

Once the various parts have been assembled together as shown in Fig. 1, the coupling is complete, firm, tight and aligned with certainty, while a certain displacement of the pipe A relatively to the pipe A' is allowed by the flexibility of the packing C and by a slight play between the pipes and the lips of the covers D'.

It is to be noted that the opposed edges of the packing ring C are grooved so that fluid entering the coupling zone acts to expand the packing ring or gasket thereby tightly sealing the outer surface thereof against the inner surface of the pipes and the rib between the end edges of the pipes.

Having now particularly described and ascertained the nature of my said invention and in what manner the same is to be performed, I declare that what I claim is:

1. A flexible coupling of the character described including in combination with a pair of pipe sections having enlarged ends forming an internal coupling chamber, a flexible packing ring arranged within the chamber and provided with a peripheral rib which projects between the opposed lips of the pipe sections, a metallic ring also arranged within the chamber and shaped so as to adhere to the inner surface of the packing ring and acting to support the packing ring, the opposed edges of the packing ring being provided with grooves so that the portions adjacent the grooves are held tightly sealed against the adjacent parts by the pressure of the liquid or gaseous medium which is adapted to pass through the pipe sections, a cover composed of two semi-circular sections fitted externally about the outer enlarged ends of the pipe sections, another ring encircling the cover and removably fixed thereto.

2. A flexible coupling as claimed in claim 1, wherein the chamber is of sufficient depth so as to house the packing ring and the metallic supporting ring in such manner that the supporting ring has its internal surface substantially flush with the internal surface of the pipe sections.

3. A flexible coupling of the character described including in combination with a pair of pipe sections having enlarged ends forming an internal coupling chamber, a flexible packing ring arranged within the chamber and provided on its outer surface medially of its end edges with an annular rib which projects between the opposed lips of the pipe sections, the inner surface of said ring being provided between its end edges with an annular groove, a metallic ring of substantially the same width as the packing ring arranged to engage the inner surface of the ring and provided on its outer surface with an annular rib which fits within the annular groove so as to prevent relative longitudinal movement of the rings, the metallic ring acting to support the packing ring, a cover composed of two semi-circular sections fitted externally about the outer and enlarged ends of the pipe sections, and another ring encircling the cover and removably fixed thereto.

4. A flexible coupling as claimed in claim 1, in which the grooves in the end edges of the packing ring are substantially V-shaped.

MARIO NOVATI.